Sept. 22, 1970 R. R. A. R. RENOUX 3,529,834
PICK-UP ARM FOR MINIATURE RECORD-PLAYERS
Filed July 30, 1968
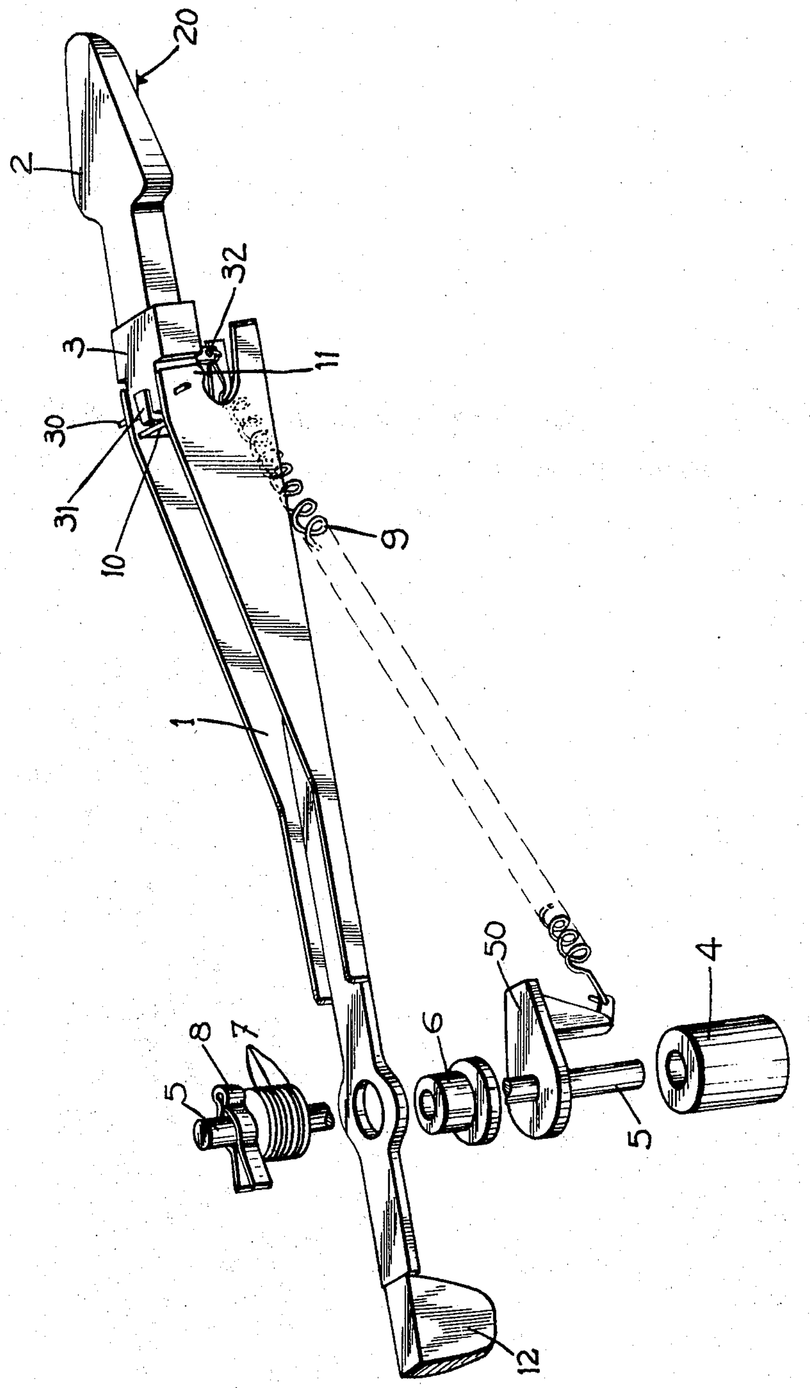

United States Patent Office 3,529,834
Patented Sept. 22, 1970

3,529,834
PICK-UP ARM FOR MINIATURE RECORD PLAYERS

Robert R. A. R. Renoux, Paris, France, assignor to CSF-Compagnie Generale de Telegraphie Sans Fil, a corporation of France Filed July 30, 1968, Ser. No. 748,790
Claims priority, application France, Mar. 18, 1968, 144,237
Int. Cl. G11b *3/10*
U.S. Cl. 274—23 4 Claims

ABSTRACT OF THE DISCLOSURE

A pick-up arm comprising an elongated member elastically mounted on a pivoting shaft perpendicular to this member and a pick-up supported by a mounting member mounted on one end of the elongated member by means of a spindle for allowing limited rotation of this mounting member about an axis perpendicular to the pivoting shaft and to the elongated member. A counterweight balances said arm about its point of support on the pivoting shaft and a preloaded draw-spring is fixed, obliquely with respect to the elongated member, between the mounting member and a fixing point near the pivoting shaft.

BACKGROUND OF THE INVENTION

The present invention relates to a pick-up arm for record-players, in particular for miniature record-players.

Record-players of this kind, also referred to as "pocket-record-players" must be capable of operating in any position, while furnishing normal reproduction even when subjected to vibrations due to an external cause, as, for example, when being carried in a moving vehicle.

In order to satisfy these requirements, it is necessary for the pressure of the stylus on the disc and the position of its tip in the groove to remain as stable as possible, even though the disc is not perfectly plane and whatever the movements imparted to the record-player. Now, in known record-players, the pick-up arm has a substantial moment of inertia as a consequence of its length and weight. Thus, it may happen that for a certain number of disturbances during playback, in particular those of short duration disturbances, that the response time of the arm is too long. In this case, not only will the stylus not preserve a constant position in relation to the groove, but also together with its holder, it will have to absorb elastically this kind of disturbances, and this further increases sound distortion.

On the other hand, in most known record-players the pressure of the stylus upon the disc is obtained by a carefully adjusted degree of unbalance of the arm with respect to its axis of rotation parallel to the plane of the disc. Therefore, such record-players cannot operate unless they are placed in normal operating position i.e. flat, (the turntable being in a substantially horizontal position) their upside down operation being out of the question because then the stylus would not bear against the disc and would even, as a matter of fact, be moved away from it by the effect of the unbalanced fraction of the weight of the arm.

SUMMARY OF THE INVENTION

It is an object of this invention to overcome the above-mentioned drawbacks, by providing the pick-up arm with two parallel axes to it and about which the arm can pivot perpendicularly to the plane of the turntable, the stylus carried by one of its extremities being urged towards the record surface by means of a draw-spring.

According to the invention there is provided a pick-up arm for a record player comprising: an elongated member; a pivoting shaft perpendicular to said member; elastic means for mounting said member on said shaft, for said member and said shaft to pivot about a first axis perpendicular to said member while allowing limited pivoting of said member about a second axis perpendicular to both said first axis and said member; a pick-up for carrying a needle; a mounting member for supporting said pick-up; means for mounting said mounting member on said elongated member, at one end thereof, pivotally about a third axis perpendicular to said first axis and to said elongated member, located in the vicinity of said pick-up; means for balancing said arm about its point of support on said shaft; and a preloaded spring fixed, obliquely with respect to said elongated member, between said mounting member and a fixing point near said shaft.

Description of the preferred embodiment of the invention as shown in the accompanying drawing For a better understanding of the invention and to show how the same may be carried into effect, reference will be made to the drawing accompanying the ensuing description, the single figure of which provides a partially exploded view of the arm in accordance with the invention.

The pick-up arm according to the invention comprises an elongated member 1 mounted upon a spindle 5 which in turn is mounted for rotation in a fixed bearing 4. The arm 1 is mounted on the spindle 5 means of a damping sleeve 6 of soft rubber. The arrangement is held in position by rubber washers 7 which can also slip over the sleeve 6 and are themselves held in position on the shaft 5 by a clip 8.

The pick-up 2 carrying the sapphire stylus 20 is fixed to a mounting member 3, which is attached to the arm 1 through a spindle 30 about which it can pivot perpendicularly to arm 1. The pivoting of the member 3 about the spindle 30 are limited in the downward direction by a stop 11 and in the upward direction by a stop 31 which cooperates with the part 10 of the arm 1.

A single preloaded spring 9 is attached between a first fixing point 32 constituted by an eye lug mounted on the member 3 and a second fixing point formed by a bracket 50 integral with the pivot 5. A counterweight 12 is provided to precisely balance the arm about its point of support on the pivot 5. It is quite obvious from the drawing that if the spring 9 is to urge the stylus 20 toward the disc groove, the first fixing point 32 is to be located on the mounting member 3 somewhere between spindle 30 and stylus 20.

The arm, according to the invention, has two axes of pivoting perpendicular to the arm and parallel to the plane of disc during the playback. The oscillation about the spindle 30 enables low-amplitude short-duration playback disturbances to be absorbed. In other words, since the spindle 30 is located very close to the point at which the sapphire stylus 20 bears upon the disc, the moment of inertia which is effective as far as small displacements are concerned, is very much lower and the response time of the assembly formed by mounting member 3 and pick-up 2, very much reduced as compared to that of a rigid arm. The stop 11 limits the displacements of the member 3 in relation to the arm, to allow the sapphire stylus 20 to be lifted out of the groove, for example at the end of a playback. The second axis of pivoting is at the point of attachment of the arm 1 to the pivot 5, and is obtained with the help of the elastic means used for mounting said arm i.e. its elongated member 1 on the shaft 5. This flexible arrangement allows the absorption of large-amplitude disturbances during playback.

Due to the use of the spring 9 as the only draw-spring for returning both articulations to their normal playback positions, there is in fact cooperation between them for absorbing any disturbance during playback, each articulation covering a specific range of disturbances according to its possibilities.

On the other hand, since the arm is balanced with precision about its point of attachment on the spindle 5, the contact pressure required between the stylus and the disc is produced exclusively by the spring 9 which is appropriately preloaded for this purpose. Thus, whatever the position of the record-player, the contact pressure between the stylus and the disc will always remain constant.

The bracket 50, in combination with the spring 9, ensures that the pivot 5 is maintained within its bearing 4 even when the record-player is operating upside down, while also allowing easy dismounting of the arm assembly. More precisely, when the arm assembly is urged, through the action of draw-spring 9, towards the record surface or against an arm support (not shown), the shaft 5 is caused to pivot about a point of the bearing 4 located at the upper edge of the inner wall thereof and on that part thereof which is nearer to the counterweight 12. This causes that point of the shaft which is in contact with the above-mentioned point of the bearing and a second point of the shaft located at the lower end thereof and on that part thereof which is nearer to the pick-up to be pressed against the inner wall of the bearing and this, in turn, provides a holding force for the shaft and frictional damping for the lateral displacements of the arm.

The pick-up arm in accordance with the invention amongst other things presents the advantages that the quality of playback is hardly sensitive to environmental vibrations to which it may be subjected and to any buckling of the record. The latter feature is particularly significant in so far as flexible discs, such as the 100 mm. diameter "pocket" discs, are concerned. The latter may readily become distorted after having been carried for some length of time in the pocket of the user, for example.

The quality of reproduction is unimpaired, regardless of the position of the record-player, even if it is upside down, since the contact pressure of arm against disc is kept constant.

The arm may be readily disassembled, it being necessary merely to removing the spindle 5 from its bearing 4 in order to lift away the whole assembly.

Of course, the invention is by no means limited to the embodiment described and shown which was given solely by way of example. In particular, the two joints in the arm can be constituted by any other equivalent systems. For example articulation of the member 3 may be built up by a leaf spring instead of the spindle 30 providing the mounting member with the same freedom of movement as spindle 30.

What is claimed is:

1. A pick-up arm for a record player comprising: an elongated arm member; a shaft rotating about a first axis coaxial with said shaft and substantially perpendicular to said arm member; elastic means for mounting said arm member on said shaft, said elastic mounting means allowing a limited pivoting of said arm member about a second axis perpendicular to both said first axis and said arm member; a pick-up for carrying a stylus; a mounting member for supporting said pick-up; means for mounting said mounting member on said arm member, at one end thereof, pivotally about a third axis parallel to said second axis, said third axis being located in the vicinity of the pick-up; counter-weight means for balancing said arm about said shaft; a first fixing point integral with said mounting member and located between said third axis and said stylus; a second fixing point, independent of said arm member and located in the vicinity of said shaft; and a preloaded spring fixed, obliquely with respect to said arm member, between said first and said second fixing points.

2. A pick-up arm as claimed in claim 1, wherein said elastic means comprise an elastic sleeve fitted on said shaft, said elongated member being fitted on said sleeve, and means for maintaining said elongated member on said sleeve, said elastic means being made of a material having the consistency of soft rubber.

3. A pick-up arm as claimed in claim 1, wherein said second fixing point is provided at one end of a bracket-shaped arm, the other end of which is integral with said shaft.

4. A pick-up arm as claimed in claim 1, wherein said means for mounting said mounting member comprise a second shaft coaxial with said third axis.

References Cited

UNITED STATES PATENTS

| | | | |
|---|---|---|---|
| 3,042,757 | 7/1962 | Wagner | 274—46 |
| 3,231,283 | 1/1966 | Stanton | 274—23 |
| 3,261,610 | 7/1966 | Wagner | 274—23 |
| 2,354,558 | 7/1944 | Thompson | 274—24 |

FOREIGN PATENTS

| | | |
|---|---|---|
| 658,215 | 10/1953 | Great Britain. |
| 608,086 | 9/1960 | Italy. |

LEONARD FORMAN, Primary Examiner

C. E. PHILLIPS, Assistant Examiner